United States Patent Office 2,719,148
Patented Sept. 27, 1955

2,719,148

STABILIZATION OF ADENOSINE POLYPHOSPHORIC ACIDS

Ferdinand Reiff and Heinrich Kirchhoff, Mannheim, Germany, assignors to Zellstofffabrik Waldhof, Mannheim-Waldhof, Germany No Drawing. Application November 10, 1952,
Serial No. 319,778

Claims priority, application Germany November 14, 1951

14 Claims. (Cl. 260—211.5)

The invention relates to a process of improving the stability of adenosine polyphosphoric acids and to the resultant improved adenosine polyphosphoric acids.

Adenosine polyphosphoric acids are marketed in the form of their salts in the solid form as well as in the liquid form. These preparations have hitherto been unsatisfactory as regards their quality. The primary reason for this is that the preparations are unsable. It has been observed, in connection with preparations which hitherto have been marketed, that in a short time phosphoric acid is split off from the original adenosine polyphosphoric acid. Apparently the liberated acid accelerates further decomposition.

The object of the invention is the improvement of the stability and quality of adenosine polyphosphoric acids and of preparations produced therewith. A particular purpose of the invention is the stabilization of adenosine polyphosphoric acids and salts, that is—the reduction of speed of decomposition thereof.

It has been found that adenosine polyphosphoric acids can be improved when substances which are suitable for establishing a pH value lying in the alkaline range—i. e. between pH 7.5 and pH 11.5 are added to the alkali salts thereof. Suitable substance for establishing a pH value in the alkaline range comprise, according to the invention, basically reacting inorganic or organic substances or substances which, in solution, are capable of buffering the phosphoric acid split off from an adenosine polyphosphoric acid. Suitable inorganic basically reacting substances according to the invention are caustic alkalies, caustic soda, pyrophosphates and the like. Suitable inorganic buffer substances according to the invention are for example buffering mixtures of borax and boric acid and the like. Suitable organic substances according to the invention are glycocoll, aminoethyl alcohol, arginine, choline and the like.

The adenosine polyphosphoric acids to be improved according to the invention are adenosine diphosphoric acid and adenosine triphosphoric acid. The adenosine polyphosphoric acids are used in the form of their alkali salts.

The process according to the invention can be carried out in various ways. For example the added substances can be added to a solution of an alkali salt of an adenosine polyphosphoric acid. However it is also possible to simultaneously crystallize a solid alkali salt of an adenosine polyphosphoric acid with an added substance. Other types of mixtures can also be used.

The treatment of the alkali salts of adenosine polyphosyhoric acids according to the invention is carried out in such manner that the solution of hte adenosine polyphosphoric acid and added substances has a pH value between 7.5 and 11.5. In most cases pH values between 8 and 10 have been found to be particularly advantageous; nevertheless the invention is not restricted to this range.

The adenosine poylphosphoric acids improved according to the invention, i. e. the adenosine diphosphoric acid and adenosine triphosphoric acid, are characterized, relative to hitherto marketed conventional preparations, by improved properties and therefore constitute part of the invention.

In the following examples, the process in accordance with the present invention is further explained, the further explanation being given by way of illustration and explanation only, and not by way of limitations, since various changes therein may be made by those skilled in the art without departing from the scope and the spirit of the present invention.

EXAMPLE 1

125 mg. of sodium adenosine triphosphate with a pH of 6.8 was dissolved in 5 cc. of water and treated with a 2% aqueous sodium pyrophosphate solution, until the pH value of the solution was about 8.3. Hereto 5 cc. of the $Na_4P_2O_7$-solution was added. The solutions were maintained at a temperature of about 20° C. and about 35° C. for several months.

The analysis of the sodium adenosine triphosphate after two months was as follows for the treated and untreated solutions:

| Storage Temperature | Decomposition of NaATP in percent | |
|---|---|---|
|  | With addition of sodium pyrophosphate (pH 8.3) | Without adding pyrophosphate (pH 6.8) |
| 20° | 2.8 | 12.8 |
| 35° | 21.5 | 53.6 |

These values indicate monthly decomposition of sodium adenosine triphosphate of about 1.5% at 20° C. where a pyrophosphate solution has been added as contrasted with a 6.4% monthly decomposition of sodium adenosine triphosphate maintained at this same temperature for the same time where no addition has been made prior to storage.

EXAMPLE 2

125 mg. of sodium adenosine triphosphate (pH 6.8) was dissolved in 5 cc. of water and treated with a borax-boric acid aqueous solution until the pH value of the solution was about 8.5. Hereto 2 ccm. of a solution were added, which was prepared by mixing 1.75 ccm. of a 1.9% $Na_2B_4O_7.10H_2O$-solution and 0.75 and 0.75 cc. of a 1.2% $H_3BO_3$-solution. This solution was stored at temperatures of about 20° C. and about 35° C. for several months. The analysis of the sodium adenostine triphosphate after two months storage was as follows for the treated and untreated solutions so stored:

| Storage Temperature | Decomposition of Na-ATP in Percent | |
|---|---|---|
|  | With addition of borax-boric acid solution, percent (pH 8.5) | Untreated; percent (pH 6.8) |
| 20° C | 3.6 | 18.4 |
| 35° C | 12.6 | 51.8 |

EXAMPLE 3

125 mg. of sodium adenosine triphosphate (pH 6.8) was dissolved in 5 cc. of water and was treated with 4.5 cc. of an aqueous solution containing 33.8 mg. glycocoll and 26.3 mg. NaCl and 0.5 ccm. of a n/10 aqueous solution of caustic soda until the pH value of the so-treated solution attained a value of about 7.5. The so-treated solution was stored at 20° C. for one month and upon analysis of the solution, no change in the sodium adenosine triphosphate was noted as contrasted with 1.2% decomposition in the sodium adenosine triphosphate solution stored for the same period of time at the same temperature, which control solution of the same concentration contained no stabilizing additive.

EXAMPLE 4

To 1000 mg. of the sodium salt of adenosine triphosphoric acid, before the drying of the salt, was added 240 mg. of sodium pyrophosphate and the homogeneous salt mixture was crystallized. The dried salt mixture was stored at 20° C. for one month as was also the untreated sodium salt of adenosine triphosphoric acid, dried under the same conditions and stored under the same conditions. Analysis of the salt mixture showed a decomposition of adenosine triphosphoric acid of 1.1% as contrasted with a decomposition of 1.4% of the adenosine triphosphoric acid content in the untreated control sample.

EXAMPLE 5

In Table I below there is summarized the decomposition data of various experiments, in which the sodium salt of adenosine triphosphoric acid in aqueous solution is stored at 20° C. at time intervals of from 8 months to 13 months. The decomposition values have been determined for adenosine triphosphoric acid in the stabilized sodium salt solutions, stabilized with the indicated additive as set forth in the table and for a control solution of the same concentration of the sodium salt without the additive, subjected to the identical storage treatment. Accordingly, the decomposition of the adenosine triphosphoric acid solution is indicated with and without the addition of a stabilizer. The table clearly indicates the improvement and stability of the solution due to the addition of the stabilizing additive which is added in an amount to bring the pH of the solution to the value indicated in the table.

EXAMPLE 6

In Table II which is given below, the experimental data is summarized to indicate the decomposition of aqueous solutions of the sodium salt of adenosine diphosphoric acid which have been stored at 20° C. for 7 months, the first of these solutions treated with sodium hydroxide to a pH value of 8.5, the second of these solutions treated with a borax-boric acid buffer containing 0.668 gm. borax ($Na_2B_4O_7.10H_2O$) and 0.185 gm. of boric acid in 100 cc. of an aqueous solution of sodium adenosine diphosphate containing 0.92 gm. of the sodium adenosine diphosphate salt. Decomposition values are likewise given for control samples of sodium adenosine diphosphate of the same concentration stored under identical conditions for the same period of time. Comparison between the "untreated" control values and the stabilized values indicates the improvement which is obtained by the action of the stabilizing agents.

Table II

| Stabilizer and amount added | pH value | Storage Time in months at 20° C. | Decomposition of Na-ATP in weight percent ||||
|---|---|---|---|---|---|---|
| | | | Total with stabilizer, percent | Total without stabilizer, percent | per month with stabilizer, percent | per month without stabilizer, percent |
| NaOH added to pH 8.5 | 8.5 | 7 | 13.4 | 40.0 | 1.9 | 5.7 |
| Borate Buffer 0.668 g. borax +0.185 g. boric acid in 100 cc. of aqueous solution of sodium adenosine triphosphate | 8.3 | 7 | 7.9 | 31.9 | 1.1 | 4.5 |

EXAMPLE 7

Although adenosine polyphosphoric acids are usually employed in the form of the aqueous solutions of the alkali salts thereof, they are also used in the form of their salts in a solid form as well and the following example illustrates the improvement obtained in accordance with the invention to stabilize solid prepartions of adenosine polyphosphoric acid.

To an aqueous solution of the sodium salt of adenosine triphosphoric acid is added sodium pyrophosphate in an amount of 25% by weight of said adenosine triphosphate salt. The concentration of the adenosine triphosphate salt is 80%. The mixed pyrophosphate-adenosine triphosphate salts are crystallized from the aqueous solution and dried. The dried salt mixture is stored for 8 months at 20° C. An equal amount of the untreated sodium salt of adenosine triphosphoric acid was crystallized and dried under the same conditions and stored under the same conditions as the treated salt for the same period of time at 20° C. After 8 months storage at 20° C. the pyro- Table I

| Stabilizer added to solution and amount thereof | pH value | Storage Time in months at 20° C. | Decomposition of Na-ATP in weight percent ||||
|---|---|---|---|---|---|---|
| | | | Total with stabilizer, percent | Total without stabilizer, percent | per month with stabilizer, percent | per month without stabilizer, percent |
| NaOH added to pH 9.3 | 9.3 | 11 | 13.5 | 85.5 | 1.2 | 7.8 |
| $Na_2CO_3$ added to pH 9.3 | 9.3 | 8 | 6.2 | 50.0 | 0.8 | 6.2 |
| Sodium pyrophosphate 83% by weight of Na-ATP in a 2% $Na_4P_2O_7$-solution | 8.3 | 13 | 17.0 | 55.5 | 1.3 | 4.3 |
| Borate Buffer 0.668 g. borax. 0.185 g. boric acid in 100 cc. of Na-ATP aqueous solution | 8.3 | 11 | 4.5 | 26.5 | 0.4 | 2.4 |
| Aminoethyl alcohol 1% by weight of Na-ATP aqueous solution | 8.9 | 11 | 9.7 | 78.0 | 0.9 | 7.1 |
| Arginine 1.8% by weight of Na-ATP aqueous solution | 8.8 | 11 | 6.0 | 61.0 | 0.5 | 5.5 |
| Choline 0.62% by weight of Na-ATP aqueous solution | 9.4 | 8 | 7.9 | 38.5 | 1.0 | 4.8 | phosphate treated sample showed a decomposition of 25.6% by weight of adenosine triphosphoric acid. The decomposition of the dried sodium salt of adenosine triphosphoric acid without the stabilizing agent, prepared and stored under the same conditions, was 45.5% by weight, as adenosine triphosphoric acid. This indicates monthly decomposition rate of 3.2% for the pyrophosphate stabilized adenosine triphosphate preparation as contrasted with a monthly decomposition rate of 5.7% in the unstabilized mixture. In the foregoing examples the potassium salt of adenosine triphosphoric acid as well as the other alkali metal salts is the full equivalent of the sodium salt. Further, the stabilizing substances to establish the pH value in the alkaline range in accordance with the arrangement include the potassium and other alkali metal salts of the pyrophosphates and borates as well as alkali metal hydroxides. The stabilization obtained in accordance with the invention by the addition of these stabilizing agents is but little effected by changes in concentration of the adenosine polyphosphoric acid or its salts in aqueous solution.

The purity of the adenosine polyphosphate salts employed in the foregoing examples was at 90%. Adenosine polyphosphate salts possessing an other grade of purity may be treated according the invention with the same effect.

The addition of phenol or the like as an antiseptic is not mentioned in the examples as self-evident for those skilled in the art.

What is claimed is:

1. A stabilized alkali salt of adenosine polyphosphoric acid of a purity of at least about 90% containing a buffer capable of neutralizing phosphoric acid and in an amount which is sufficient to maintain the pH of said acid at a value between about 7.5 and about 11.5.

2. A stabilized alkali salt of adenosine polyphosphoric acid of a purity of at least about 90% containing a buffer capable of neutralizing phosphoric acid and in an amount which is sufficient to maintain the pH of said acid at a value between about 8 and about 10.

3. A stabilized alkali salt as in claim 1 wherein the salt is an alkali salt of adenosine triphosphoric acid.

4. A stabilized alkali salt as in claim 1 wherein the salt is an alkali salt of adenosine diphosphoric acid.

5. A stabilized alkali salt as in claim 1 wherein the buffer is a basically reacting inorganic substance.

6. A stabilized alkali salt as in claim 1 wherein the stabilizing substance is sodium hydroxide.

7. A stabilized alkali salt as in claim 1 wherein the buffer is a basically reacting inorganic substance selected from the group consisting of alkali hydroxides and basically reacting salts of alkali metals.

8. A stabilized alkali salt as in claim 1 wherein the buffer is an alkali salt of pyrophosphate.

9. A stabilized alkali salt as in claim 1 wherein the buffer is a buffer mixture of a salt of a strong base and a weak acid together with the weak acid, said buffer mixture maintaining the pH of the stabilized adenosine polyphosphoric acid at an alkaline pH.

10. A stabilized alkali salt as in claim 9 wherein the buffer mixture is a mixture of borax and boric acid.

11. A stabilized alkali salt as in claim 1 wherein the buffer is a basically reacting organic substance.

12. A stabilized alkali salt as in claim 1 wherein the buffer is glycocoll.

13. A stabilized alkali salt as in claim 1 wherein the stabilizing agent is arginine.

14. A stabilized alkali salt as in claim 1 wherein the stabilizing agent is choline.

References Cited in the file of this patent

UNITED STATES PATENTS

| | | |
|---|---|---|
| 1,978,881 | Lautenschlager et al. | Oct. 30, 1934 |
| 2,606,899 | Smythe et al. | Aug. 12, 1952 |

OTHER REFERENCES

Acta Med. Scand., 163, 32–38 (1945).

Cataline: J. Am. Pharm. Assoc., Prac. Pharm. Ed., November 1946, pp. 484–9.